UNITED STATES PATENT OFFICE.

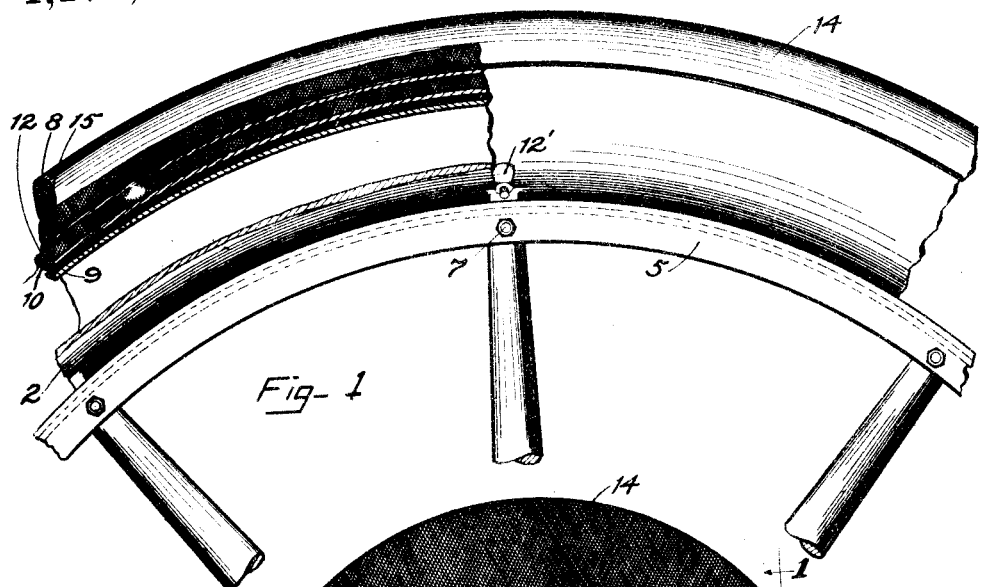
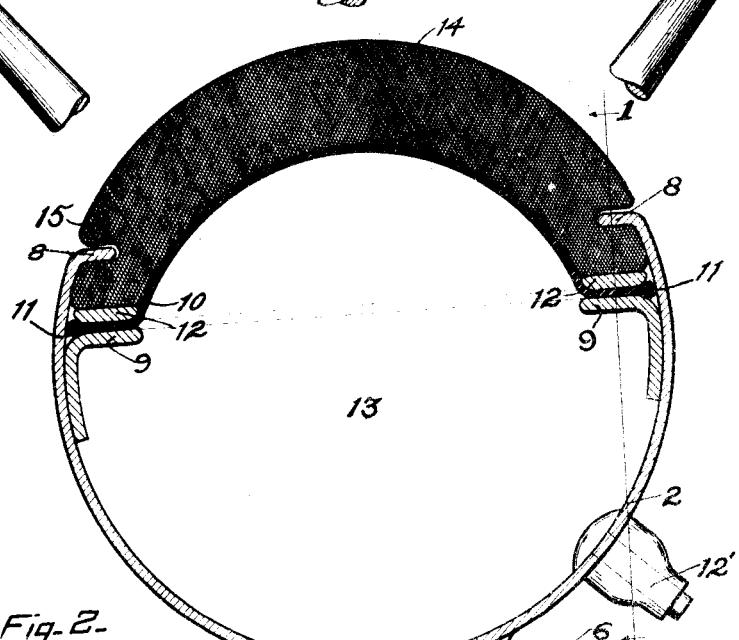

ANDREW B. BURT, OF SAN FRANCISCO, CALIFORNIA.

TIRE.

1,170,957.  Specification of Letters Patent.  Patented Feb. 8, 1916.

Application filed November 10, 1914. Serial No. 871,275.

*To all whom it may concern:*

Be it known that I, ANDREW B. BURT, a citizen of the United States, residing in the city and county of San Francisco and State of California, have invented certain new and useful Improvements in Tires, of which the following is a specification.

The present invention relates to vehicle tires, and more particularly to that type of tire commonly termed pneumatic, and the invention has for its principal objects to dispense with the fabric case now universally employed in the construction of the side walls of a tire, and to substitute therefor a metallic rim and to which a flexible tread surface is detachably secured; to dispense with the inner tube now universally in use, and to substitute a flexible strip therefor which is detachably secured to the metallic rim, and by so doing lowering the cost of manufacture and reducing the cost of upkeep. With my improved structure I reduce the liability of blowouts, punctures and rim cuts by dispensing with considerable of the flexible material now in use.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims hereto appended may be resorted to without departing from the spirit or sacrificing any of the advantages of the invention.

To more fully comprehend the invention, reference is directed to the accompanying drawings, wherein—

Figure 1 is a view in side elevation, partly broken away, disclosing an embodiment of my invention. Fig. 2 is a transverse sectional view.

Referring more particularly to the drawings, wherein like characters of reference designate corresponding parts throughout the several views—1 is a wheel felly on which is detachably mounted the annular semi-circular metallic rim structure 2, preferably formed of a single piece of material, and said structure is formed with a flat base 3 adapted to rest on the periphery of the felly 1. An angular flange 4 is formed preferably integral with the base 3 and the same abuts against one side edge of the felly 1. A ring 5 formed with a flange 6, adapted to engage over one edge of the base 3, abuts against the opposite side edge of the felly 1, and through said ring 5, felly 1, and flange 4, are adapted to extend the securing bolts 7. The ends of the side walls of the rim structure 2 are turned inwardly or flanged, as at 8, and secured in any suitable manner, as by brazing to the opposite inner side walls of said rim structure below the flanges 8, are the annular inwardly projecting supporting flange members 9. An unbroken annular member or strip of material 10, preferably rubber, and formed at its edges with the annular beads 11, is adapted to rest at its opposite edges on the supporting flange members 9, and the same is detachably secured in position in any suitable manner, as by the clamping rings 12, of any suitable construction, which frictionally clamp the edges of the material to the flanges 9. The beads prevent the edges of the material from pulling between the clamp rings 12 and flanges 9 when air is forced under compression through the valve 12' into the chamber 13 formed by the rim structure 2 and the material 10. The clamping of the strip 10 between the flanges 9 and rings 12 provides an air tight joint and prevents the escape of the air from the chamber. An annular tread 14, semi-circular in cross section and preferably formed of flexible, yieldable material, such as rubber, is detachably secured to the rim structure 2, and said tread is provided on its outer surface adjacent opposite side edges with the annular grooves 15, in which are received the flanges 8 of the rim structure 2. It will be apparent that the internal air pressure in the chamber 13 will force the inner member 10 outwardly and the same will exert pressure over the inner surface of the tread and maintain the edges thereof in locked engagement with the flanges of the rim member 2.

My improved structure dispenses with the inner tube now universally in use, and the tread surface requires but approximately one-half of the material necessary in the now used outer casing, thus reducing the initial cost of manufacture and lowering the cost of maintenance.

Having thus described my invention, I claim:—

1. The combination of a hollow metallic rim semi-circular in cross section and formed on its peripheral edges with inwardly disposed integral flanges and provided on its inner surface intermediate said peripheral edges with oppositely disposed inturned annular flanges lying in a plane parallel to said first mentioned flanges, an annular strip of flexible material for resting at its opposite side edges on the outer surface of said last mentioned flanges to form with said rim an air chamber, clamping rings for encircling the outer surfaces of the opposite edges of the strip to clamp the same tightly against the outer surface of said last mentioned flanges, and a flexible tread member formed on its outer surface adjacent to its opposite side edges with annular grooves and adapted for receiving said first mentioned flanges when said tread is positioned on said rim.

2. The combination of a hollow rim semi-circular in cross section and formed on its inner surface intermediate of its peripheral edges with oppositely disposed inturned annular flanges and on each peripheral edge with an annular flange, an elastic band adapted to rest at its opposite side edges on said flanges to form with the rim an air chamber, a ring for encircling each flange to clamp the opposite edges of said band thereto, a flexible annularly grooved protecting surface detachably engaging said peripheral flanges, and a valve controlled connection in said rim for admitting air into said air chamber.

3. The combination with a hollow rim semi-circular in cross section terminating on each peripheral edge in an integral inwardly disposed flange, a strip of flexible material detachably secured to the opposite inner side edges of said rim to form with the rim an air chamber, and a flexible tread member formed with annular grooves for receiving said flanges when said tread is positioned on said rim.

In testimony whereof I have signed my name to this specification in the presence of two subscribing witnesses.

ANDREW B. BURT.

Witnesses:
HARRY A. TOTTEN,
D. B. RICHARDS.